(12) United States Patent
Ihara (10) Patent No.: US 8,199,339 B2
(45) Date of Patent: Jun. 12, 2012

(54) PRINTING SYSTEM AND METHOD FOR SECURELY PRODUCING SELF-AUTHENTICATING DOCUMENTS

(75) Inventor: Fujio Ihara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1354 days.

(21) Appl. No.: 11/581,862

(22) Filed: Oct. 17, 2006

(65) Prior Publication Data

US 2008/0003034 A1    Jan. 3, 2008

(30) Foreign Application Priority Data

Jun. 30, 2006    (JP) .................................. 2006-180859

(51) Int. Cl.
*G06K 15/00*    (2006.01)

(52) U.S. Cl. ...... 358/1.14; 235/454; 235/494; 340/5.86; 382/306; 382/209; 382/225; 705/51; 358/1.15

(58) Field of Classification Search ................. 358/1.14, 358/1.15, 3.28; 235/449, 494; 340/5.86; 347/106; 382/209, 225, 306; 380/200; 705/51; 713/156, 176

See application file for complete search history.

(56) References Cited

U.S. PATENT DOCUMENTS

| | | | |
|---|---|---|---|
| 4,423,415 A * | 12/1983 | Goldman | ...................... 340/5.86 |
| 6,985,600 B2 | 1/2006 | Rhoads et al. | |
| 7,035,428 B1 * | 4/2006 | Smith | ............................ 382/101 |
| 7,533,062 B2 * | 5/2009 | Sanchez et al. | ................. 705/51 |
| 2002/0012133 A1 | 1/2002 | Haruna et al. | |
| 2003/0035147 A1 * | 2/2003 | Patton et al. | .................. 358/3.28 |
| 2003/0035539 A1 * | 2/2003 | Thaxton | ........................... 380/51 |
| 2003/0184798 A1 * | 10/2003 | Enomoto et al. | ............. 358/1.15 |
| 2004/0036924 A1 | 2/2004 | Ihara | |
| 2004/0039914 A1 * | 2/2004 | Barr et al. | ...................... 713/176 |
| 2004/0114023 A1 * | 6/2004 | Jacobsen et al. | .............. 347/106 |
| 2004/0255808 A1 | 12/2004 | Nagashima | |

FOREIGN PATENT DOCUMENTS

EP    1288871    3/2003

(Continued)

OTHER PUBLICATIONS

Machine Translation of JP 2004-102562.*

(Continued)

*Primary Examiner* — King Poon
*Assistant Examiner* — David S Cammack
(74) *Attorney, Agent, or Firm* — Gesmer Updegrove LLP (57) ABSTRACT

There is provided a printing system including a reading unit that reads paper identification information of a paper sheet, a first controller that implements control for, when instructed to print document data, causing the reading unit to read the paper identification information of the paper sheet used for printing and transmitting a request for a document containing the read paper identification information, and a second controller that implements control for, when printing document data containing the paper identification information received in response to the request for the document on the paper sheet, causing the reading unit to read the paper identification information of the paper sheet used for printing and, if the read paper identification information and the received paper identification information contained in the document data do not match, inhibiting printing of the document data.

6 Claims, 4 Drawing Sheets

FOREIGN PATENT DOCUMENTS

| | | |
|---|---|---|
| JP | 6155846 | 6/1994 |
| JP | 11144119 | 5/1999 |
| JP | 2002041695 | 2/2002 |
| JP | 2003136828 | 5/2003 |
| JP | 2004094874 | 3/2004 |
| JP | 2004102562 A * | 4/2004 |
| JP | 2004140764 | 5/2004 |
| JP | 2006018525 | 1/2006 |

OTHER PUBLICATIONS

Office Action issued on Feb. 5, 2008 in corresponding Australian Patent Application No. 2006230667.

Notice of Grounds for Rejection mailed on Nov. 30, 2010, in connection with corresponding Japanese Patent Application No. 2006-180859 and English translation thereof.

* cited by examiner

PRINTING SYSTEM AND METHOD FOR SECURELY PRODUCING SELF-AUTHENTICATING DOCUMENTS

BACKGROUND

1. Technical Field

The present invention relates to a printing system, a printing control method, a computer readable medium and a computer data signal.

2. Related Art

With the recent growth in network technology and cryptographic technology, research and development for realizing electronic government services have become more serious. A certificate issuance service is such that an applicant who wishes to obtain a certificate applies for issuance of an official certificate such as a resident register via a terminal located at home or in a community center, post office, convenience store or the like, and an issuance server receives the application, generates certificate data, and transmits the data to a printer located at a desired site of the applicant or a predetermined site to allow the applicant to print out the certificate.

SUMMARY

According to an aspect of the present invention, there is provided a printing system including a reading unit that reads paper identification information of a paper sheet, a first controller that implements control for, when instructed to print document data, causing the reading unit to read the paper identification information of the paper sheet used for printing and transmitting a request for a document containing the read paper identification information, and a second controller that implements control for, when printing document data containing the paper identification information received in response to the request for the document on the paper sheet, causing the reading unit to read the paper identification information of the paper sheet used for printing and, if the read paper identification information and the received paper identification information contained in the document data do not match, inhibiting printing of the document data.

BRIEF DESCRIPTION OF THE DRAWINGS

Exemplary embodiment(s) of the present invention will be described in detail based on the following figures, wherein.

DETAILED DESCRIPTION

Figure 1:
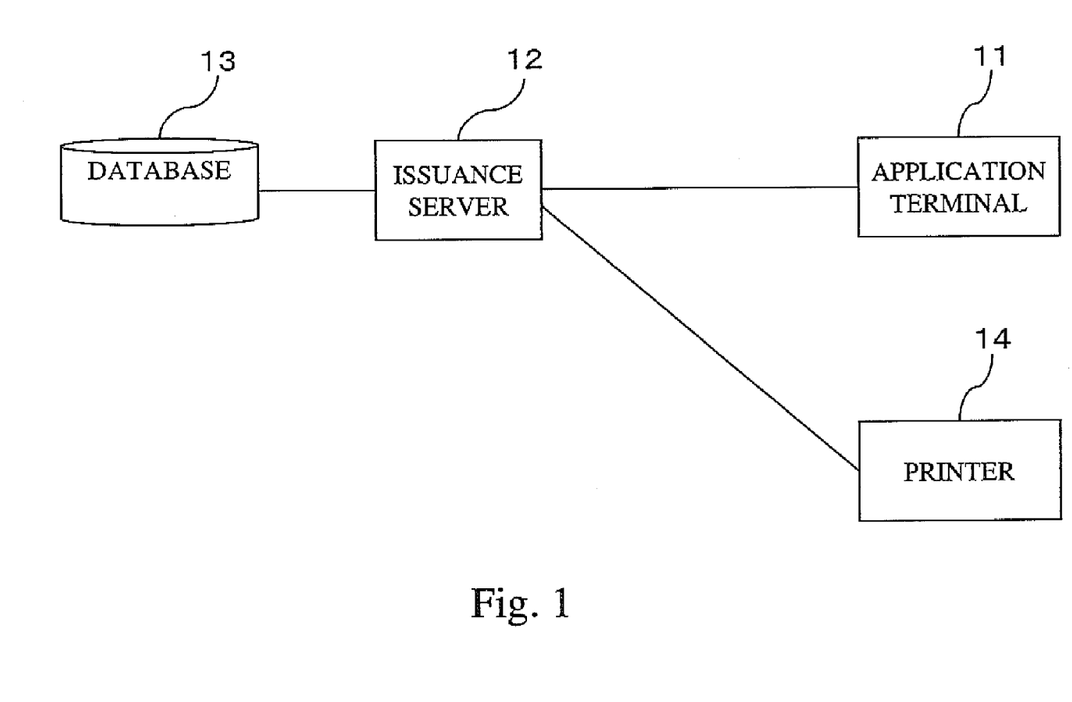
FIG. 1 is a view showing an example of a document issuance system to which an exemplary embodiment is applied.

An example of a system to which an exemplary embodiment may be applied is described hereinafter with reference to FIG. 1. The system of FIG. 1 includes an application terminal 11, an issuance server 12, a database 13 of the issuance server 12, and a printer 14, all of which are interconnected through a data communication network such as the Internet or a LAN (Local Area Network), a communication cable, or the like.

The application terminal 11 is a terminal which may be used by an applicant to apply for the issuance of a resident register or the like. The application terminal 11 may be a computer such as a personal computer, into which software for official document issuance application is installed. The application terminal 11 may be located in a public place such as a community center, a post office, or a convenience store. A personal computer of each user can also serve as the application terminal 11 if software for official document issuance application is installed therein. The applicant who wishes to request the official document issuance service uses the application terminal 11 to submit an application to the issuance server 12.

In application processing, an applicant inputs user information such as a user ID and a password which enables identification of the applicant and also inputs to the application terminal 11 a type of a requested document (e.g. resident register) and the number of copies. The user information may be entered by way of manual input by the applicant by means of an input device such as a keyboard or a touch panel attached to the application terminal 11, or by way of reading a token such as an IC card held by the applicant by means of a reader attached to the application terminal 11. The input information is transmitted as application information to the issuance server 12.

The issuance server 12 performs document issuance processing on the basis of the application information sent from the application terminal 11. For example, the issuance server 12 creates an electronic document (document data) of a requested document such as a resident register and generates a unique application receipt number corresponding to the electronic document. The issuance server 12 then associates the electronic document and the application receipt number corresponding thereto with a user ID for identifying the applicant and stores them into the database 13.

The printer 14 is used to print out an issued document, and, just like the application terminal 11, may be located in a public place such as a community center, a post office, or a convenience store or at the applicant's home. The printer 14 has a UI (user interface) function for receiving a print request from an applicant. The printer 14 may be a single unit which has both a UI function and a printing function, or a system in which a printer for printing data on a paper sheet and a computer such as a personal computer for controlling the printer are connected through a network or a cable. The printer 14 placed at the applicant's home is often the latter. The printer 14 may also function as the application terminal 11.

Figure 2:
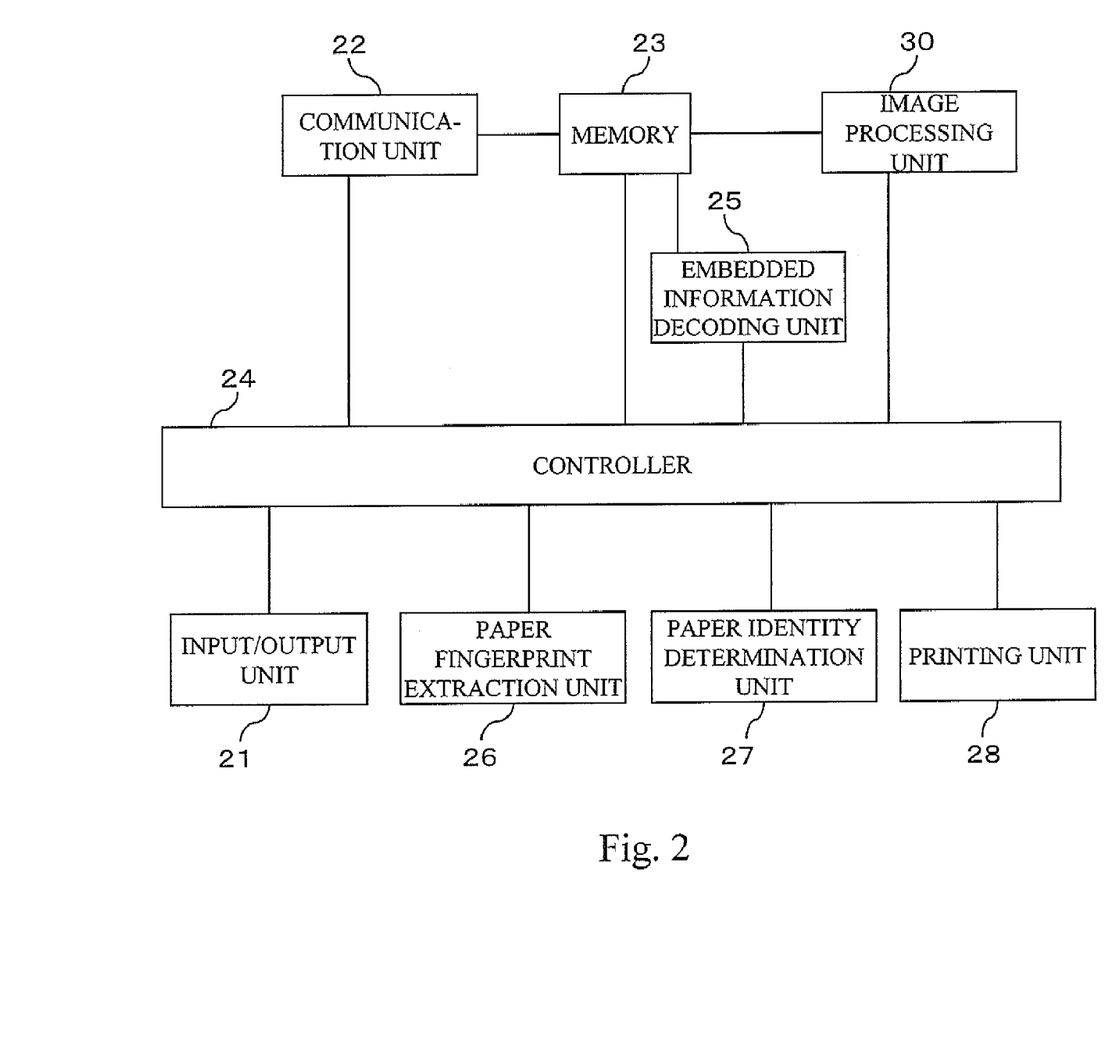
FIG. 2 is a view showing an example of the inner structure of a printer in the system according to an exemplary embodiment.

The functional structure of the printer 14 is described in detail hereinafter with reference to FIG. 2. An input/output unit 21 is a functional module to serve as UI. The UI function can be implemented by the combination of an input device such as a keyboard and a display device such as a liquid crystal display. It can also be implemented by a device having both an input function and a display function, such as a touch panel. Further, the UI function can be implemented by a reader device for reading a token such as an IC card which stores user information of an applicant and/or an application receipt number. A communication unit 22 provides a function for communication with the issuance server 12 or another computer through network such as a LAN or the Internet. A memory 23 is a working memory used by a controller 24 of the printer 14, and it may be implemented by a semiconductor RAM (Random Access Memory). The memory 23 is used for temporarily storing the data received from the issuance server 12 or another computer through a network, loading operation program of the printer 14, or as a temporary work area for various calculations. An embedded information decoding unit 25 decodes the embedded information embedded in document data to be printed which are transmitted through a network. The embedded information may include paper identification information for uniquely identifying a paper sheet to be printed. The paper identification information may employ a paper fingerprint (or information obtained based on the paper fingerprint) which is actually read from a paper sheet by a paper fingerprint extraction unit 26 to be described later. If the received document data are encrypted or compression-coded such as JPEG (Joint Photographic Experts Group) data, the embedded information decoding unit 25 decodes the document data for decryption or decompression-decoding and then decodes the embedded information.

The paper fingerprint extraction unit 26 reads a paper fingerprint of a paper sheet which is to be used for printing. The paper fingerprint extraction unit 26 may include a CCD camera which is disposed above a paper feed section (paper tray) for photographing the micro pattern (paper fingerprint) of an area which is large enough to identify the paper sheet from a part of the paper sheet to be printed next. The camera for reading a paper fingerprint may be disposed above a paper path rather than above a paper feed section for reading the paper fingerprint of the paper sheet present on the paper path.

An image processing unit 30 interprets rendering instruction and generates image data (e.g. raster image data) which can be processed by a printing unit 28. If the document data are compressed and coded data such as JPEG (Joint Photographic Experts Group) data, the image processing unit 30 decodes the data to generate the image data which can be processed by the printing unit 28. On the image data thus generated, the image processing unit 30 performs image processing such as color conversion in accordance with the characteristics of the printing unit 28. The print raster image data which can be printable on a paper sheet are thereby generated. The printing unit 28 receives the print raster image data and prints the image data on a paper sheet.

A paper identity determination unit 27 determines whether or not a match exists between the paper identification information which is decoded from the embedded information in the document data by the embedded information decoding unit 25 and the paper identification information which is obtained from the paper fingerprint that is actually extracted from a paper sheet by the paper fingerprint extraction unit 26. The matching determination is performed in consideration of a reading error of the paper fingerprint extraction unit 26. The controller 24 controls overall the operation of the printer 14 in communication with an applicant of an issuance service and the issuance server 12.

Figure 3:
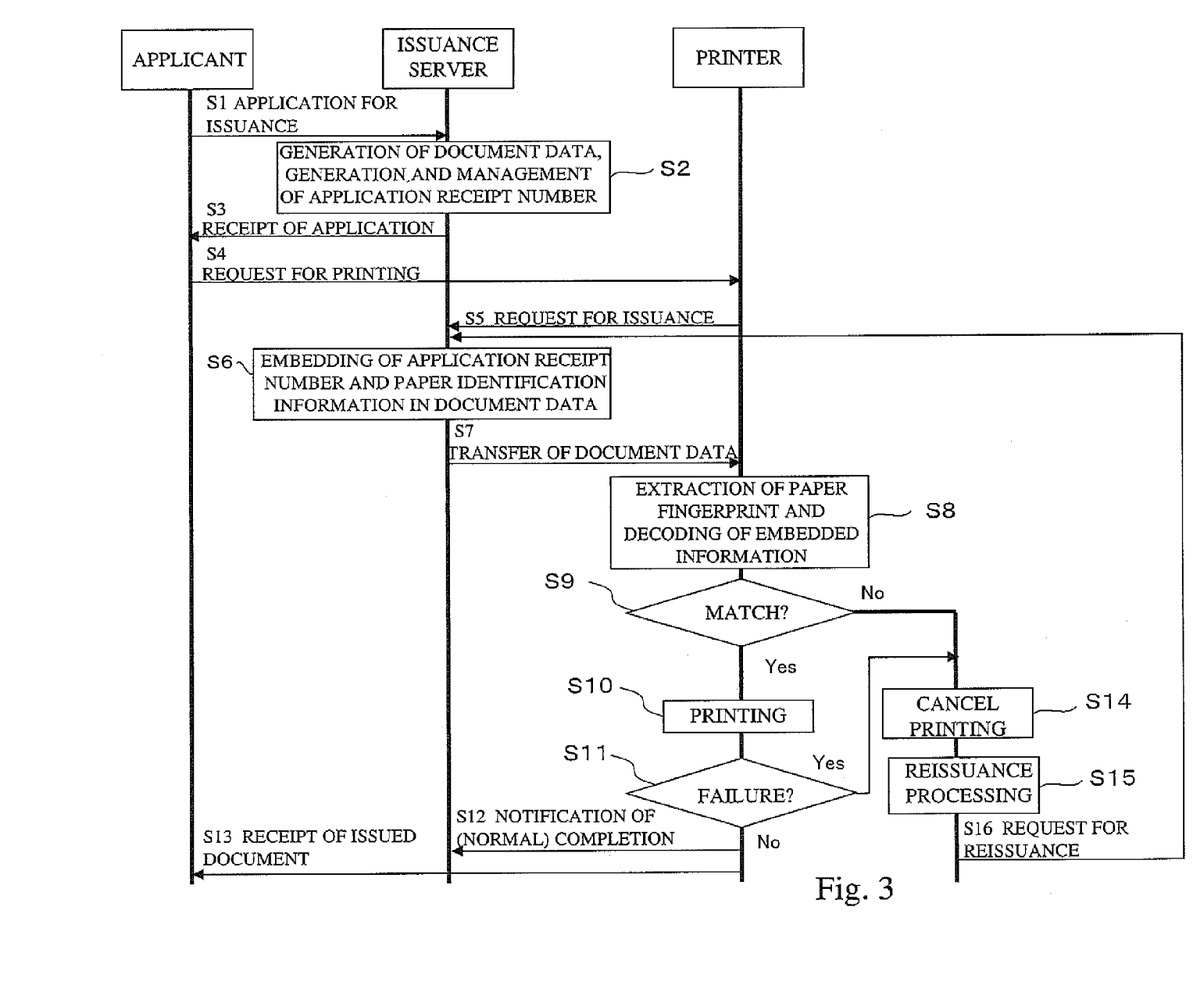
FIG. 3 is a view showing a process flow in the system according to an exemplary embodiment.

The entire process flow of an official document issuance system according to an exemplary embodiment is described hereinafter with reference to FIG. 3.

The applicant inputs user information such as user ID to the application terminal 11 to receive user authentication from the issuance server 12. If the applicant is authenticated as a valid user, the applicant then inputs a type of a document for which issuance is requested, the number of copies of the document, and so on through a UI screen to thereby apply for the issuance to the issuance server 12 (S1). The issuance server 12 then generates document data corresponding to the requested document and also generates a unique application receipt number for the requested document. The issuance server 12 registers the application receipt number in association with the document data into the database 13 (S2) and returns the application receipt number to the applicant (application terminal 11) (S3).

Upon receiving the application receipt number, the applicant inputs the user information such as user ID and the application receipt number through the UI of the printer 14 which is located in a prescribed place and makes a print request (S4). Upon receiving the print request, the printer 14 reads the paper fingerprint of the paper sheet to be used for printing corresponding to the print request by the paper fingerprint extraction unit 26 and transmits to the issuance server 12 an issuance request containing paper identification information obtained from the paper fingerprint, the user information, and the application receipt number (S5).

Upon receiving the issuance request, the issuance server 12 retrieves from the database 13 the document data corresponding to the application receipt number contained in the request and embeds the paper identification information contained in the issuance request into the retrieved document data (S6) The paper identification information may be embedded by converting paper identification information into an image code such as a barcode or a two-dimensional barcode and adding it to a prescribed position or a blank space on the image indicated by document data, or by embedding paper identification information as a print tolerant digital watermark into the image indicated by document data. The print tolerance of a digital watermark means the characteristics which allow reproduction of information which is embedded as a digital watermark from a paper sheet on which an image containing the digital watermark is printed, by optically reading the printed paper sheet. In Step 6, the application receipt number contained in the issuance request may also be embedded into the document data in addition to the paper identification information.

Because the paper identification information is embedded as an image in the document data, the paper identification information contained in the embedded information can be reproduced from an image obtained by photographing, by means of a scanner or a camera, a paper on which the document data is printed. The printer 14 may retrieve the document data from the issuance server 12 by means of the application receipt number received from the issuance server 12 and compare it with the document data obtained in Step S7.

The issuance server 12 then transmits to the printer 14 the document data in which the paper identification information is embedded and the application receipt number (S7). If the application receipt number is also embedded in the document data, Step S7 may consist of transmitting solely the document data.

Upon receiving the document data, the printer 14 decodes the embedded information from the received data to thereby extract the paper identification information and further activates the paper fingerprint extraction unit 26 to thereby extract the paper fingerprint of the print sheet to be used for printing of the document data and obtain the paper identification information of the print sheet (S8). Then, the paper identity determination unit 27 compares the paper identification information reproduced from the embedded information of the document data with the paper identification information read from the paper sheet (S9). If they match, the printing unit 28 prints the document data on the paper sheet (S10).

If, on the other hand, the two pieces of the paper identification information do not match in Step 9, there is a possibility that a paper sheet has been replaced after the issuance request (S5) and, if the printing proceeds, it would only result in an invalid print. In such a case, the printer 14 cancels the printing job (S14), generates reissuance request information which contains the paper identification information obtained from the paper sheet in Step S8, the user information, and the application receipt number (S15), and transmits the reissuance request information to the issuance server 12 (S16). It is possible to cause the printer 14 to read paper identification information again from the paper sheet rather than using the paper identification information read in Step S8. Upon receiving the reissuance request information, the issuance server 12 generates document data in which the paper identification information contained in the reissuance request is embedded and sends the generated document data back to the printer 14 (S6, S7).

While the document data are being printed on the paper sheet in Step S10, the controller 24 monitors whether a printing error due to paper jam or the like occurs (S11). If printing fails, the controller 24 cancels the current printing job (S14). After the printer 14 returns to the normal state as a result of recovery work such as elimination of a jammed paper, the controller 24 causes the paper fingerprint extraction unit 26 to read the paper identification information of a print sheet. Then, the printer 14 generates reissuance request information which contains the paper identification information, the user information, and the application receipt number (S15) and transmits the reissuance request information to the issuance server 12 (S16). Upon receiving the reissuance request information, the issuance server 12 operates as described above.

After the printing process of the Step S10 completes normally, the controller 24 notifies the issuance server 12 of the application receipt number and information indicating normal completion of printing (S12). The applicant thereby receives the requested document (S13). Upon receiving the notification that the printing completes normally, the issuance server 12 deletes from the database 13 the entry corresponding to the application receipt number indicated by the notification. Instead of deletion, it is possible to set a flag indicating printing completion to the entry.

Following the above process, the applicant receives a paper document on which paper identification information of the paper sheet is printed properly. The authenticity of the document can be determined by scanning and analyzing the document and reproducing the paper identification information from the embedded information in the image and then comparing the information with the paper fingerprint read from the paper sheet of the document. If the code indicating the application receipt number is embedded as an image in the document data, it is possible to extract the application receipt number embedded in the image read from the printed document and use the extracted application receipt number for obtaining electronic data of the document from the issuance server 12 or another device on a network.

A case of outputting multiple pages of prints from the printer 14 in response to one-time issuance application is described hereinbelow. Such a case may involve one document containing multiple pages or a user requesting the issuance of multiple copies of documents in one-time application. In such a case, the issuance server 12 may assign one application receipt number to one issuance application, then assign an output number indicating the order of outputs to each page to be printed for the issuance application, and embed a combination of the application receipt number and the output number; e.g. "application receipt number—output number," into an image of each page of the document. Then, the issuance server 12 may transmit the generated document data page by page together with information about remaining print page count to the printer 14 in Step S7 in response to an issuance request from the printer 14. If the remaining print page count is greater than zero upon completion of printing of one page, the printer may read paper identification information of a paper sheet to be printed next, generate an issuance request, and transmit the request to the issuance server 12 (S5).

If the issuance server 12 receives the issuance request for multiple pages, the issuance server 12 may subtract the number of printed copies from a total page number and, upon the number reaching zero, delete the entry of the application receipt number corresponding to the issuance request from the database 13 in the issuance server 12 or set a flag indicating the print completion to the entry. If, on the other hand, the printer 14 sends an issuance request page by page to the issuance server 12 for the printing of multiple pages so that an application receipt number is assigned to each page, the issuance server 12 may delete the entry of the corresponding application receipt number in the database 13 or set a print completion flag to the entry each time the printing of one page completes normally.

As described in the foregoing, if multiple pages are printed and output for one issuance application, the printer 14 may send paper identification information of a paper sheet page by page to the issuance server 12. If the application receipt number is in the form of "application receipt number—output number" as described above, the issuance server 12 can easily manage the data. However, the application receipt number may be assigned according to an arbitrary rule.

The exemplary embodiment may be applied to a system for obtaining an official or a private document. The exemplary embodiment may be also applied to a case where a user obtains a document, an image, and so on from a common information management server.

Although in above example a paper fingerprint of a paper sheet used for printing is read and used as paper identification information, in the case of employment of a paper sheet to which an RFID (Radio Frequency Identification) tag storing paper identification information of each paper sheet is attached, paper identification information may be read from the RFID.

Figure 4:
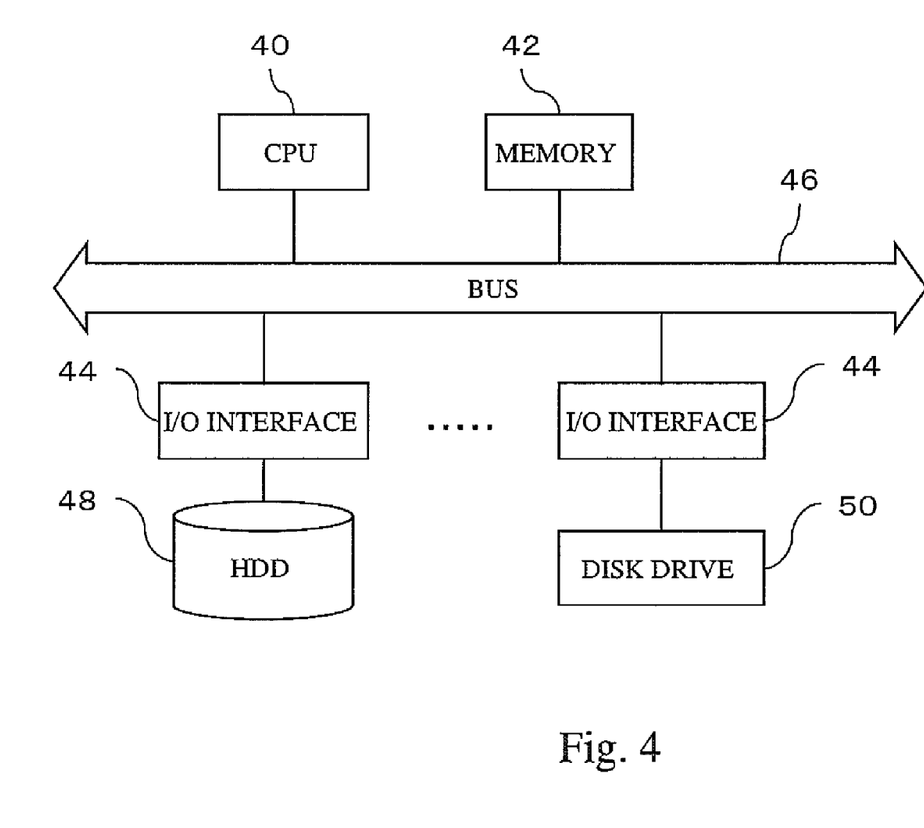
FIG. 4 is a view showing an example of a hardware construction of a computer.

The control of the printer 14 described above can be typically implemented by executing a program which describes the functions or processing contents of each unit on a computer. As shown in FIG. 4, the computer may have a circuit configuration in the form of hardware in which a CPU (Central Processing Unit) 40, memory (primary storage) 42, I/O (Input/Output) interfaces 44, and the like are connected through a bus 46. Through the bus 46, a hard disk drive 48 and a disk drive 50 for reading a portable nonvolatile recording medium of various standards such as CD, DVD, and flash memory may be connected. Such drives 48 and 50 serve as external memory storage devices. The program which contains the description of the processing of the exemplary embodiment is saved on a fixed storage device such as the hard disk drive 48 or other types of nonvolatile recording devices through a recording medium such as a CD or DVD or through a network and then installed in the computer. The program stored in the fixed storage is loaded to a memory and executed by the CPU, thereby implementing the processing of the exemplary embodiment.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printing system comprising:
a printer;
a reading unit that reads a paper fingerprint of a paper sheet;
a first controller that implements control for, when receiving a print instruction containing a document identifier which identifies document data to be printed causing the reading unit to read the paper fingerprint of the paper sheet used for printing and transmitting, to an upper device which is an origin of the document data, a request for a document containing paper fingerprint information and the document identifier, the paper fingerprint information being determined based on the read paper fingerprint;
a second controller that implements control for, when printing, by the printer, document data containing the paper fingerprint information received from the upper device in response to the request for the document on the paper sheet, causing the reading unit to read the paper fingerprint of the paper sheet used for printing and, if the read paper fingerprint and the paper fingerprint indicated by the paper fingerprint information contained in the document data match, causing the printer to start a print process of the document data, and, if the read paper fingerprint and the paper fingerprint indicated by the paper fingerprint information contained in the document data do not match, inhibiting printing of the document data by the printer; and
a third controller that implements control for, when the second controller causes the printer to start the print process of the document data, monitoring execution of the print process by the printer, and, if failure of the print process is detected by the monitoring, canceling the print process, causing the reading unit to read a paper fingerprint of a new paper sheet after the printer returns to a normal state, and transmitting, to the upper device, a new request for the document containing paper fingerprint information and the document identifier, the paper fingerprint information being determined based on the read paper fingerprint, wherein
the second controller implements control for, when printing, by the printer, new document data containing the paper fingerprint information received from the upper device in response to the new request for the document on the paper sheet, causing the reading unit to read a paper fingerprint of a paper sheet used for printing and, if the read paper fingerprint and the paper fingerprint indicated by the paper fingerprint information contained in the new document data match, causing the printer to start a print process of the new document data, and, if the read paper fingerprint and the paper fingerprint indicated by the paper fingerprint information contained in the document data do not match, inhibiting printing of the new document by the printer, and wherein
the upper device registers the document data into a database as an entry and returns a receipt number to a user, once notification is received that printing completed normally, the upper device deletes the entry from the database.

2. The printing system according to claim 1, further comprising:
a controller that implements control for, when printing of the document data is canceled in response to the control of the second controller, transmitting a request for the document containing the paper identification information read by the reading unit under the control of the second controller.

3. A printing control method comprising:
(a) when instructed by an upper device to print document data, causing a reading unit to read a paper fingerprint of a paper sheet used for the printing by a printer;
(b) transmitting, to the upper device which is an origin of the document data, a request for document containing paper fingerprint information based on the read paper fingerprint;
(c) when printing the document data containing the paper fingerprint information received from the upper device in response to the request for document on the paper sheet, causing the reading unit to read paper fingerprint of a paper sheet used for the printing;
(d) controlling to cause, if the read paper fingerprint and the paper fingerprint indicated by the paper fingerprint information contained in the document data match, the printer to start a print process of the document data and to inhibit, if the read fingerprint and the paper fingerprint indicated by the paper fingerprint information contained in the document do not match, printing of the document data by the printer;
(e) controlling to monitor, when the printer is caused to start the print process of the document data in step (d), execution of the print process by the printer, and, when failure of the print process is detected by the monitoring, to cancel the print process, to cause the reading unit to read a paper fingerprint of a new paper sheet after the printer returns to a normal state, and to transmit, to the upper device, a new request for a document containing paper fingerprint information and the document identifier, the paper fingerprint information being determined based on the read paper fingerprint; and
(f) controlling to cause, when printing, by the printer, new document data containing the paper fingerprint information received from the upper device in response to the new request for the document on the paper sheet, the reading unit to read a paper fingerprint of a paper sheet used for printing and to cause, if the read paper fingerprint and the paper fingerprint indicated by the paper fingerprint information contained in the new document data match, the printer to start a print process of the new document data, and to inhibit, if the read paper fingerprint and the paper fingerprint indicated by the paper fingerprint information contained in the document data do not match, printing of the new document data by the printer, the upper device registers the document data into a database as an entry and returns a receipt number to a user, once notification is received that printing completed normally, the upper device deletes the entry from the database.

4. The printing control method according to claim 3, further comprising:
when printing of the document data is canceled, transmitting a request for the document containing the paper identification information read in the step of causing the reading unit to re-read paper identification information of a paper sheet.

5. A non-transitory computer readable medium storing a program causing a computer to execute a process for printing control, the process comprising:
(a) when instructed by an upper device to print document data, causing a reading unit to read a paper fingerprint of a paper sheet used for the printing by a printer;

(b) transmitting, to the upper device which is an origin of the document data, a request for document containing paper fingerprint information based on the read paper fingerprint;

(c) when printing the document data containing the paper fingerprint information received from the upper device in response to the request for document on the paper sheet, causing the reading unit to read paper fingerprint of a paper sheet used for the printing;

(d) controlling to cause, if the read paper fingerprint and the paper fingerprint indicated by the paper fingerprint information contained in the document data match, the printer to start a print process of the document data and to inhibit, if the read fingerprint and the paper fingerprint indicated by the paper fingerprint information contained in the document do not match, printing of the document data by the printer;

(e) controlling to monitor, when the printer is caused to start the print process of the document data in step (d), execution of the print process by the printer, and, when failure of the print process is detected by the monitoring, to cancel the print process, to cause the reading unit to read a paper fingerprint of a new paper sheet after the printer returns to a normal state, and to transmit, to the upper device, a new request for a document containing paper fingerprint information and the document identifier, the paper fingerprint information being determined based on the read paper fingerprint; and (f) controlling to cause, when printing, by the printer, new document data containing the paper fingerprint information received from the upper device in response to the new request for the document on the paper sheet, the reading unit to read a paper fingerprint of a paper sheet used for printing and to cause, if the read paper fingerprint and the paper fingerprint indicated by the paper fingerprint information contained in the new document data match, the printer to start a print process of the new document data, and to inhibit, if the read paper fingerprint and the paper fingerprint indicated by the paper fingerprint information contained in the document data do not match, printing of the new document data by the printer, the upper device registers the document data into a database as an entry and returns a receipt number to a user, once notification is received that printing completed normally, the upper device deletes the entry from the database.

6. The non-transitory computer readable medium according to claim 5, further comprising:

when printing of the document data is canceled, transmitting a request for the document containing the paper identification information read in the step of causing the reading unit to re-read paper identification information of a paper sheet.

* * * * *